United States Patent [19]

Meyer

[11] 4,345,931

[45] Aug. 24, 1982

[54] GELATED FERTILIZERS, PROCESS FOR THEIR MANUFACTURE AND THEIR USE IN PLANT FERTILIZATION

[75] Inventor: Klaus Meyer, Kelkheim, Fed. Rep. of Germany

[73] Assignee: Hoechst Aktiengesellschaft, Frankfurt am Main, Fed. Rep. of Germany

[21] Appl. No.: 87,944

[22] Filed: Oct. 25, 1979

[30] Foreign Application Priority Data

Oct. 27, 1978 [DE] Fed. Rep. of Germany ....... 2846831

[51] Int. Cl.³ ............................................... C05C 9/00
[52] U.S. Cl. ......................................... 71/28; 71/29; 71/30; 71/64.09; 71/64.1
[58] Field of Search ..................... 71/1, 11, 27, 28, 29, 71/30, 64 C, 64 G, DIG. 1, 64.08, 64.09, 64.10, 903, 904

[56] References Cited

U.S. PATENT DOCUMENTS 2,867,944 1/1959 Fletcher ............................... 71/1 X
3,706,545 12/1972 Gray et al. ......................... 71/27 X
3,898,070 8/1977 Dazzi ........................................ 71/1
4,055,974 11/1977 Jackson, Jr. ........................... 71/11

*Primary Examiner*—S. Leon Bashore, Jr.
*Assistant Examiner*—Ferris H. Lander
*Attorney, Agent, or Firm*—Curtis, Morris & Safford

[57] ABSTRACT

Water-soluble fertilizer pastes containing 58 to 88% by weight of water-soluble plant nutrients, 0 to 5% by weight of water-soluble micronutrients, 4 to 12% by weight of polyglycol ethers having at least 9 ethylene oxide units and/or water-soluble polyglycol ether derivatives having at least 8 ethylene oxide units per molecule and 8 to 25% by weight of water, process for their manufacture and their use for plant fertilization.

10 Claims, No Drawings

GELATED FERTILIZERS, PROCESS FOR THEIR MANUFACTURE AND THEIR USE IN PLANT FERTILIZATION

This invention relates to water-soluble gelated fertilizers, to a process for their manufacture and to their use for plant fertilization.

In general, aqueous solutions of fertilizers are prepared by dissolving solid nutrient salts or soluble fertilizers in water or by diluting liquid fertilizer concentrates, so called liquid fertilizers. Solid fertilizers completely dissolve in water only after a considerable period of time, while liquid fertilizer concentrates have a relatively low nutrient content and must be stored and transported in liquid-proof and corrosion-resistant containers. Moreover, the dosability of solid as well as liquid fertilizers is unsatisfactory.

It is, therefore, the object of the present invention to provide water-soluble gelated fertilizers containing from 58 to 88% by weight, preferably 63 to 82% by weight, of water-soluble plant nutrients, preferably urea and/or N- and/or P- and/or K- and/or NPK-fertilizer salts, 0 to 5% by weight, preferably 1 to 3 and more preferably 2% by weight, of water-soluble micronutrients, 4 to 12% by weight, preferably 6 to 10% by weight of polyglycol ethers containing at least 9 ethylene oxide units and preferably having a mean molecular weight of 400 to 10,000, more preferably 600 to 6,000, and/or water-soluble polyglycol ether derivatives containing at least 8 ethylene oxide units, preferably 9 to 230 and more preferably 11 to 60 ethylene oxide units, and 8 to 25% by weight of water.

The term ethylene oxide units (EO) is intended to indicate the number of ethylene oxide units per molecule of polyglycol ether or polyglycol ether derivative, which are addition products of ethylene oxide (cf. for example, Kurt Lindner, Tenside-Textilhilfsmittel-Waschrohstoffe, Wiss. Verlagsgesellschaft Stuttgart (1964), volume I, pages 183 and 865 et seq.).

It is another object of the present invention to provide a process for the manufacture of the foregoing water-soluble gelated fertilizers, which comprises dissolving, at a temperature of from 35° to 100° C., preferably 45° to 70° C., 4 to 12 parts by weight, preferably 6 to 10 parts by weight of polyglycol ethers with at least 9 EO units, preferably having a mean molecular weight of 400 to 10,000, more preferably 600 to 6,000, and/or water-soluble polyglycol ether derivatives having at least 8 EO units, preferably 9 to 230 and more preferably 11 to 60 EO units, in 8 to 25 parts by weight of water, adding to the solution with stirring 58 to 88 parts by weight, preferably 63 to 82 parts by weight of water-soluble plant nutrients, preferably selected from the group consisting of urea, N-, P-, K- and N,P,K-salts, and 0 to 5 parts by weight, preferably 1 to 3 and more preferably 2 parts by weight, of water-soluble micronutrients, and cooling the mixture obtained to room temperature (about 20° to 25° C.) while stirring. According to one embodiment the urea is added first. Stirring or thorough agitation of the mixture during cooling is indispensable in order to prevent the nutrients from separating.

The fertilizer pastes obtained by the process of the invention are fully homogeneous and, when filled in tubes, they can be readily pressed out in the form of a strand and thus easily dosed. After storage in closed containers for several weeks at either room temperature or at +40° C. or in the cold, no separation can be observed. The density of the pastes varies with the type and amount of the components contained therein, it is preferably in the range of from about 1.4 to 1.6 kg/l. The pH is not critical and is generally determined, by the paste components, especially the nutrients. It may be in the acid or neutral range or even in the basic range. The fertilizer pastes according to the invention are readily and rapidly soluble in water and, in general, they give clear solutions, especially with concentrations of up to about 10% by weight. For identification, the pastes can be colored with known dyestuffs. If the pastes contain surface-active polyglycol ether derivatives which may tend to foam in aqueous solution, the usual defoaming agents, for example silicones, may be added.

As polyglycol ethers, which are obtained, for example, by reacting ethylene oxide with glycol or lower glycol ethers, or as water-soluble polyglycol ether derivatives, the following products, named by way of example, can be used: polyglycol ethers (commercialized mostly as polyglycols), preferably those having a mean molecular weight of from 400 to 10,000, more preferably 600 to 6,000. Low molecular weight compounds of this type within the indicated range are liquid, while those with higher molecular weight are solids having a wax-like consistency. The specified polyglycol ethers are preferred. Suitable water-soluble polyglycol ether derivatives having at least 8 EO units in the molecule are those in which preferably one or both terminal hydroxy groups are substituted, preferably etherified, esterified or substituted by amino, imino or acid amide groups, and which may be surface-active. Especially preferred compounds are alkyl-polyglycol ethers and alkylphenyl-polyglycol ethers obtained by addition of ethylene oxide on linear or branched, monohydric or polyhydric, saturated or unsaturated alcohols or on alkylphenols. Acylpolyglycol ethers can also be used. There are mentioned by way of example methylpolyglycol ethers, ethylpolyglycol ethers, butylpolyglycol ethers, octylpolyglycol ethers, laurylpolyglycol ethers, isotridecylpolyglycol ethers, hexadecylpolyglycol ethers, octadecylpolyglycol ethers, preferably those having up to 60 EO units, for example (n-$C_{18}$)alkylpolyglycol ethers having 50 EO units, 25 EO units or 11 EO units, ($C_{12}$–$C_{15}$)alkylpolyglycol ethers having 25 EO units, addition products of ethylene oxide on glycerol, glycerol esters or sorbitans, nonylphenylpolyglycol ethers having 30 EO units, 23 EO units or 15 EO units, tributylphenylpolyglycol ethers having 50 EO units or 18 EO units, esters of polyglycol ethers with organic or inorganic acids or acid derivatives, for example lower or higher carboxylic acids such as acetic acid, propionic acid, lauric acid, ($C_8$-$C_{24}$)-carboxylic acids, fatty acids, for example ($C_{12}$-$C_{15}$) fatty acylpolyglycol esters having 25 EO units as well as esters with phosphoric acid and the derivatives thereof.

There are also preferred water-soluble block-polymeric polyether glycols (BcPG) as obtained, for example by the addition of ethylene oxide (EO) on a condensation product of propylene oxide (PyO) with propylene glycol, such as BcPG 20 (20% by weight of EO and 80% by weight of PyO; liquid)

BcPG 40 (40% by weight of EO and 60% by weight of PyO; liquid)

BcPG 80 (80% by weight of EO and 20% by weight of PyO; solid, molecular weight from 6,600 to 9,300).

Mixtures of various polyglycol ethers and/or various water-soluble polyglycol ether derivatives can also be used.

Suitable water-soluble plant nutrients are all known water-soluble inorganic and/or organic fertilizers, fertilizing salts or mineral fertilizers, for example urea, ammonium nitrate, ammonium sulfate, ammonium phosphate, potassium chloride, potassium sulfate, potassium phosphate, ammonium sulfate-nitrate, Chilean nitrate, potassium-ammonium phosphate, sodium nitrate, nitrogeneous fertilizers, urea-containing mixed fertilizers, potassium salts, N,P,K-compound fertilizers, N,P,K-compound fertilizers containing trace elements and mixtures of such fertilizers or mineral fertilizers.

Suitable water-soluble micronutrients are especially the chlorides, sulfates or nitrates of Ca, Mg, Fe, Ni, Mn, Zn, Cu, and Co as well as Mo in the form of water-soluble molybdates and boron in the form of boric acid or boric anhydride. They can be added in any desired combination and their amount can be adapted to the requirements in each case.

To ensure that the aforesaid salts are soluble in water some of the micronutrients have to be stabilized, for example by suitable complex-forming agents. Commercialized concentrates of micronutrients generally contain the salts in complexed form. The commercial concentrate of micronutrients A used in the following examples is such a complexed product.

A special advantage of the process according to the invention resides in the fact that plant nutrients and/or micronutrients need not be used in dry form but can optionally be processed advantageously in the form of moist filter cakes. In the latter case, the amount of water contained in the filter cake has to be taken into consideration. This is also true for the water content, if any, of the polyglycol ethers or their derivatives.

As the fertilizer pastes according to the invention dissolve almost immediately in water additional operations necessary in the case of solid fertilizers, such as making into a paste, preparation of a master solution, warming of water, can be dispensed with completely. Moreover, the troublesome dusting of pulverulent fertilizers is eliminated by the pastes. In addition, the nutrient content of the pastes is 2 to 3 times higher than that of the same volume of the known liquid fertilizers. Dosing and handling of the fertilizer pastes, contained, for example, in tubes, is much easier than that of comparable fertilizer formulations. Another advantage is that the pastes do not leak as may be the case with liquid fertilizers from pervious containers. The high unit weight of about 1.4 to 1.6 kg/l of the pastes according to the invention, which is much higher than the density of solid fertilizers or the specific gravity of liquid fertilizers, results in a considerable economy of storage, packing and transportation volume. On the whole, the novel fertilizer pastes according to the invention represent a considerable advance in the art and the properties exhibited thereby are extremely surprising and not suggested by the art.

The proportion of the individual plant nutrients in the pastes of the invention is not critical and can be adapted to the usual and known requirements for fertilizers. The pastes may contain a sole nutrient or any nutrient combination.

The fertilizer pastes of the invention have an excellent fertilizing effect. For application they are dissolved in water and applied in the form of aqueous solutions onto the crop plants and/or culture soil or medium. Alternatively, they can also be blended into the culture soil, or medium. The applied concentrations are not critical and can be adapted to the practical requirements in each case, for example the types of plants and the properties of the soil. Solutions containing from 0.05 to 5% by weight of paste have proven especially advantageous although lower or higher concentrations are effective and may be preferable in some cases.

The following examples illustrate the invention.

EXAMPLE 1

NPK-paste 18-12-15 with micronutrients ($K_2O$ as KCl)

Composition:

34.17% by weight of industrial grade urea
19.84% by weight of industrial grade monoammonium phosphate
25.17% by weight of industrial grade potassium chloride
2.02% by weight of micronutrient concentrate A
7.5% by weight of polyglycol 6,000
11.3% by weight of water.

Production of 100 kg of paste:

In a 300 liter vessel with a stirrer of the type Nauta mixer the waxy polyglycol ether, i.e. polyglycol 6,000, is dissolved in the indicated amount of water at a temperature of 60° to 70° C. At the same temperature the amount of urea is added and stirring is continued until no more solid urea particles are present. Next, the monoammonium phosphate, potassium chloride and trace element concentrate A are blended in. A homogeneous liquid phase is obtained which is cooled to 25° C. while stirring. In this manner a homogeneous paste is obtained having the following nutrient content: 18% by weight of N, 12% by weight of $P_2O_5$, 15% by weight of $K_2O$ and 2% by weight of micronutrient in salt form. The paste has a pH of 2.8, a density of 1,455 g/l at 20° C. and a creamy-pasty consistency.

After a time of storage of several weeks at room temperature, at +40° C. and at −10° C., respectively, a separation cannot be observed.

The paste is well soluble in water and forms limpid solutions. Aqueous solutions of up to 10% are still limpid after standing for 24 hours. The pH of the aqueous solutions depends on the concentration and after preparation of the solution they are found to be as follows:

| paste concentration | pH value (glass electrode) |
|---|---|
| 0.05% by weight | 7.0 |
| 2% by weight | 5.7 |
| 5% by weight | 5.1 |
| 10% by weight | 4.6 |

EXAMPLE 2

NPK paste 16-12-14 with micronutrients ($K_2O$ as $K_2SO_4$)

Composition 29.83% by weight of industrial grade urea
19.84% by weight of industrial grade monoammonium phosphate
28.20% by weight of industrial grade potassium sulfate
2.02% by weight of micronutrient concentrate A
7.9% by weight of polyglycol 6,000
12.21% by weight of water.

Production of 100 kg of paste

The paste is prepared as described in Example 1 with the exception that mixing to obtain the homogeneous phase is not carried out at 60° to 70° C. but at 40° to 50° C.

The homogeneous paste obtained has a creamy-pasty and supple consistency. Its pH is 3.2 and its density 1.540 g/l at 20° C.

The plant nutrient content of the paste is 16% by weight of N, 12% by weight of $P_2O_5$, 14% by weight of $K_2O$ and 2% by weight of micronutrient salts.

The storage life, temperature resistance, water solubility and the pH of aqueous solutions with concentrations of up to 10% correspond to those of the paste of Example 1.

EXAMPLES 3 to 25

The pastes are prepared as described in Example 1. Their compositions and their content of plant nutrients are listed in the following Table. In all examples homogeneous pastes of creamy-pasty consistency are obtained, the storage life, temperature resistance and solubility of which substantially correspond to those of the pastes of Examples 1 and 2.

TABLE 1

| Example No. | nutrients % b.w. | polyglocol ether component % b.w. | water % b.w. | N | $P_2O_5$ | $K_2O$ | micronutrient salts |
|---|---|---|---|---|---|---|---|
| 3 | 31.4 urea / 21.3 $(NH_4)H_2PO_4$ / 28.3 KCl | 8.0 polyglycol 6,000 | 11.0 | 17 | 13 | 17 | |
| 4 | 29.8 urea / 19.8 $(NH_4)H_2PO_4$ / 28.2 $K_2SO_4$ / 2.0 micronutrient concentrate A | 4.0 $nC_{18}$—alkylpolyglycol ether (25 EO) | 16.2 | 16 | 12 | 14 | 2 |
| 5 | 34.2 urea / 19.8 $(NH_4)H_2PO_4$ / 25.2 KCl / 2.0 micronutrient concentrate A | 7.5 polyglycol 1,000 | 11.3 | 18 | 12 | 15 | 2 |
| 6 | 27.9 urea / 26.3 $(NH_4)H_2PO_4$ / 26.7 KCl | 8.0 polyglycol 10,000 | 11.1 | 16 | 16 | 16 | |
| 7 | 27.9 urea / 26.3 $(NH_4)H_2PO_4$ / 26.7 KCl | 8.0 $nC_{18}$—alkylpolyglycol ether (50 EO) | 11.1 | 16 | 16 | 16 | |
| 8 | 41.3 urea / 18.0 $(NH_4)H_2PO_4$ / 18.3 KCl | 8.5 tributylphenyl-polyglycol ether (50 EO) | 13.9 | 21 | 11 | 11 | |
| 9 | 29.8 urea / 19.8 $(NH_4)H_2PO_4$ / 30.2 $K_2SO_4$ | 7.9 nonylphenylpolyglycol ether (30 EO) | 12.3 | 16 | 12 | 15 | |
| 10 | 20.0 urea / 19.8 $(NH_4)H_2PO_4$ / 19.8 $KNO_3$ / 20.4 $KH_2PO_4$ | 7.0 polyglycol 6,000 | 13.0 | 16 | 20 | 16 | |
| 11 | 22.7 urea / 19.8 $(NH_4)H_2PO_4$ / 28.2 $K_2SO_4$ / 10.0 $NH_4NO_3$ | 7.0 BcPG 80 (blockcopolymeric polyether glycol) | 12.3 | 16 | 12 | 14 | |
| 12 | 41.9 urea / 29.3 $(NH_4)H_2PO_4$ | 6.5 polyglycol 6,000 | 12.3 | 24 | 24 | 0 | |
| 13 | 41.3 urea / 38.0 $K_2SO_4$ | 9.0 polyglycol 6,000 | 11.7 | 19 | 0 | 19 | |
| 14 | 29.8 urea / 19.8 $(NH_4)H_2PO_4$ / 28.2 $K_2SO_4$ / 2.0 micronutrient concentrate A | 7.5 nonylphenyl-polyglycol ether (15 EO) | 12.7 | 16 | 12 | 14 | 2 |
| 15 | 29.8 urea / 19.8 $(NH_4)H_2PO_4$ / 28.2 $K_2SO_4$ / 2.0 micronutrient concentrate A | 7.0 nonylphenylpolyglycol ether (23 EO) | 13.2 | 16 | 12 | 14 | 2 |
| 16 | 29.8 urea / 19.8 $(NH_4)H_2PO_4$ / 28.2 $K_2SO_4$ / 2.0 micronutrient concentrate A | 7.5 $nC_{18}$—alkylpolyglycol ether (11 EO) | 12.7 | 16 | 12 | 14 | 2 |
| 17 | 29.8 urea / 19.8 $(NH_4)H_2PO_4$ / 28.2 $K_2SO_4$ / 2.0 micronutrient concentrate A | 7.5 $nC_{18}$—alkylpolyglycol ether (25 EO) | 12.7 | 16 | 12 | 14 | 2 |
| 18 | 29.8 urea / 19.8 $(NH_4)H_2PO_4$ / 28.2 $K_2SO_4$ / 2.0 micronutrient | 7.0 $C_{12}$–$C_{15}$—alkylpolyglycol ether (13 EO) | 13.2 | 16 | 12 | 14 | 2 |

TABLE 1-continued

| Example No. | nutrients % b.w. | polyglocol ether component % b.w. | water % b.w. | N | P$_2$O$_5$ | K$_2$O | micronutrient salts |
|---|---|---|---|---|---|---|---|
| 19 | 29.8 urea<br>19.8 (NH$_4$)H$_2$PO$_4$<br>28.2 K$_2$SO$_4$<br>2.0 micronutrient concentrate A | 7.0 C$_{12}$-C$_{15}$—alkylpoly-polyglycol ether (18 EO) | 13.2 | 16 | 12 | 14 | 2 |
| 20 | 29.8 urea<br>19.8 (NH$_4$)H$_2$PO$_4$<br>28.2 K$_2$SO$_4$<br>2.0 micronutrient concentrate A | 7.5 C$_{12}$-C$_{15}$—alkylpoly-glycol ether (25 EO) | 12.7 | 16 | 12 | 14 | 2 |
| 21 | 29.8 urea<br>19.8 (NH$_4$)H$_2$PO$_4$<br>28.2 K$_2$SO$_4$<br>2.0 micronutrient concentrate A | 7.5 BcPG (blockcopolymeric polyether glycol) | 12.7 | 16 | 12 | 14 | 2 |
| 22 | 29.8 urea<br>19.8 (NH$_4$)H$_2$PO$_4$<br>28.2 K$_2$SO$_4$<br>2.0 micronutrient concentrate A | 7.5 BcPG 40 (blockcopolymeric polyether glycol) | 12.7 | 16 | 12 | 14 | 2 |
| 23 | 29.8 urea<br>19.8 (NH$_4$)H$_2$PO$_4$<br>28.2 K$_2$SO$_4$<br>2.0 micronutrient concentrate A | 12.0 BcPG 20 (blockcopolymeric polyether glycol) | 8.2 | 16 | 12 | 14 | 2 |
| 24 | 43.6 KNO$_3$<br>32.8 (NH$_4$)H$_2$PO$_4$ | 10.6 polyglycol 6,000 | 13.0 | 10 | 20 | 20 | — |
| 25 | 63.0 urea | 12.0 polyglycol 6,000 | 25.0 | 29 | — | — | — |

What is claimed is:

1. A water-soluble fertilizer paste consisting essentially of 58 to 88% by weight of a water-soluble plant nutrient selected from the group consisting of urea, N-, P-, K- and N,P,K-fertilizer salts, 4 to 12% by weight of a water soluble gelling agent selected from the group consisting of a polyglycol ether having at least 9 ethylene oxide units or a polyglycol ether derivative having at least 8 ethylene oxide units in the molecule or mixtures thereof and 8 to 25% by weight of water.

2. The water-soluble fertilizer paste of claim 1 further comprising up to 5% by weight of a water-soluble micronutrient compound.

3. The water-soluble fertilizer paste of claim 2 wherein the micronutrient compound is a chloride, sulfate or nitrate of Ca, Mg, Fe, Ni, Mn, Zn, Cu or Co, a water-soluble molybdate, boric acid or boric anhydride.

4. The water-soluble fertilizer paste of claim 1 further comprising 1 to 3% by weight of a water-soluble micronutrient compound.

5. A method for the fertilization of plants which comprises applying to the plant or an environment susceptible to plant growth an effective amount of the water-soluble fertilizer paste defined in claim 1.

6. The method of claim 5 wherein said fertilizer paste is applied as an aqueous solution.

7. A process for the manufacture of a water-soluble fertilizer paste which comprises dissolving, at a temperature of from 35° C. to 100° C., 4 to 12 parts by weight of a water soluble gelling agent selected form the group consisting of a polyglycol ether having at least 9 ethylene oxide units or a polyglycol ether derivative having at least 8 ethylene oxide units in the molecule or mixtures thereof in 8 to 25 parts by weight of water to form a first solution, adding 58 to 88 parts by weight of a water-soluble plant nutrient selected from the group consisting of urea, N-, P-, K- and N,P,K-fertilizer salts to said first solution and cooling the resultant mixture to room temperature with continuous stirring.

8. The process of claim 7 wherein up to 5% by weight of a water-soluble micronutrient compound is added to said first solution.

9. The process of claim 7 wherein 1 to 3% by weight of a micronutrient compound is added to said first solution.

10. The process of claim 7 wherein urea is added first to said first solution.

* * * * *